Patented Aug. 23, 1938　　　　　　　　　　　　　　　　　　　2,128,188

UNITED STATES PATENT OFFICE 2,128,188

AZO DYESTUFFS AND THEIR MANUFACTURE

Adolf Krebser, Riehen, near Basel, Switzerland, assignor to the firm J. R. Geigy S. A., Basel, Switzerland.

No Drawing. Application May 1, 1937, Serial No. 140,270. In Germany May 6, 1936

14 Claims. (Cl. 260—200)

This invention is an improvement in or a modification of that described in the specification of the U. S. Patent 2,073,225.

The process of that specification consists in a manufacture of valuable ortho-hydroxyazo-dyestuffs by coupling an ortho-hydroxy-diazonium compound with an N-acyl-derivative of 2-amino-6-hydroxynaphthalene-8-sulphonic acid of the general formula

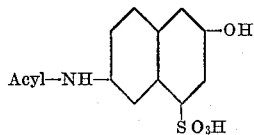

They yield dyeings which, when chromed, have characteristic properties of fastness.

The present invention is based on the observation that the process is not limited to the N-acylderivatives of 2-amino-6-hydroxynaphthalene-8-sulphonic acid. By employing instead of these compounds the N-alkyl-, N-aralkyl or N-aryl substitution products of the 2-amino-6-hydroxy-naphthalene-8-sulphonic acid, just as valuable new ortho-hydroxyazo-dyestuffs are obtained.

The afterchromed dyeings made with the new dyestuffs substantially show the same excellent properties as indicated for the dyestuffs in the U. S. Patent No. 2,073,225. In addition the fastness to light and potting is somewhat increased.

The following examples and table illustrate the invention:—

Example 1

15.4 kilos of 4-nitro-2-aminophenol are diazotized in the usual manner and coupled at 0° C. in a solution, alkaline with sodium carbonate, with 31.5 kilos of 2-phenylamino-6-hydroxy-naphthalene-8-sulphonic acid. After 20 hours the dyestuff formation is complete; the product which has separated is filtered and dried. It is a black powder soluble in water to a dull bluish green solution and in concentrated sulphuric acid to a blue-red solution. It dyes wool in an acid bath bluish green which becomes, when afterchromed, a grey of excellent fastness properties.

The 2-phenylamino-6-hydroxynaphthalene-8-sulphonic acid may be made according to known methods for the arylation of aminonaphthol sulphonic acids, for example by heating with aniline and sulphite.

Example 2

19.9 kilos of picramic acid are diazotized in the usual manner and coupled in a solution, alkaline with sodium carbonate, of 26.7 kilos of 2-dimethylamino - 6 - hydroxynaphthalene - 8 - sulphonic acid, obtained by methylation of 2-amino-6-hydroxynaphthalene-8-sulphonic acid, according to general methods for example with methyl chloride in the autoclave at 110° C. When coupling is complete, the dyestuff is filtered. After drying the new product is obtained as a dark powder soluble in water to a dull bluish green solution and in concentrated sulphuric acid to a blue-red solution. It dyes wool in an acid bath green shades which become, when afterchromed, an olive of excellent fastness properties.

Other 2-alkylamino-6-hydroxynaphthalene-8-sulphonic acids are also best suited for the production of quite analogous dyestuffs, for example: the 2-diethyl-, -propyl-, -butyl-, -amyl-amino-6-hydroxynaphthalene-8-sulphonic acid.

Example 3

22.4 kilos of 4-chloro-2-amino-phenol-6-sulphonic acid are diazotized in the usual manner and coupled with 31.5 kilos of 2-phenylamino-6-hydroxynaphthalene-8-sulphonic acid, dissolved in 200 liters of water, 100 liters of pyridine and 15 kilos of anhydrous sodium carbonate. When coupling is complete the new dyestuff is isolated in the usual manner. It is a dark powder soluble in water to a dull greenish blue solution and in concentrated sulphuric acid to a red-violet solution, dyeing wool in an acid bath dull green shades and on afterchroming changing into a fast grey. Instead of the 2-phenylamino-6-hydroxynaphthalene-8-sulphonic acid of Examples 1 and 3 may be used the analogous 2-para-tolyl-, 2-meta-xylylamino-6 - hydroxynaphthalene - 8 - sulphonic acid or other derivatives, containing alkylated phenyl radicles. The dyestuffs obtained are of quite similar fastness properties.

In the following table some other dyestuffs are mentioned and characterized by the colour of their solution in water and concentrated sulphuric acid, also by the shades of the acid and chromed dyeings on wool.

with 2-dimethylamino-6-hydroxynaphthalene-8-sulphonic acid.

| Diazo component | Coupling component | Solution in— | | Dyeings on wool | |
|---|---|---|---|---|---|
| | | Water | Concentrated sulphuric acid | Acid | Chromed |
| (1) 6 - nitro - 4 - methyl - 2 - amino - phenol. | 2 - phenyl - amino - 6 - hydroxy - naphthalene-8-sulphonic acid. | Blue | Blue-red | Bluish-green | Grey. |
| (2) 6 - nitro - 4 - chloro - 2 - amino - phenol. | 2 - phenyl - amino - 6 - hydroxy - naphthalene-8-sulphonic acid. | do | Red-violet | Greenish-blue | Do. |
| (3) 4:6-dichloro-2-amino-phenol | 2 - phenyl - amino - 6 - hydroxy - naphthalene-8-sulphonic acid. | do | do | Green | Do. |
| (4) 5-nitro-2-amino-phenol | 2 - phenyl - amino - 6 - hydroxy - naphthalene-8-sulphonic acid. | Green | do | do | Do. |
| (5) 6 - nitro - 4 - methyl - 2 - amino - phenol. | 2 - (4' - ethoxy - phenyl) - amino - 6 - hydroxy - naphthalene - 8 - sulphonic acid. | Blue | do | do | Olive-grey. |
| (6) 6 - nitro - 2 - amino - phenol - 4 sulphonic acid. | 2 - (4' - ethoxy - phenyl) - amino - 6 - hydroxy - naphthalene - 8 - sulphonic acid. | Greenish-blue | Blue-red | Blue | Grey. |
| (7) 6 - nitro - 4 - chloro - 2 - amino - phenol. | 2 - benzyl - amino - 6 - hydroxy - naphthalene - 8 - sulphonic acid. | Blue-grey | Violet | Bluish-green | Brownish-grey. |
| (8) 6 - nitro - 4 - chloro - 2 - amino - phenol. | Glycine of the 2 - amino - 6 - hydroxy - naphthalene - 8 - sulphonic acid. | Blue | Red-violet | Blue | Grey. |
| (9) 4 - nitro - 2 - amino - phenol | N - methyl - ω - sulphonic acid of the 2 - amino - 6 - hydroxy - naphthalene - 8 - sulphonic acid. | Green | Red | Dull green | Olive. |

Instead of the benzyl radicle there may be used a halogen substituted benzyl group, such as 4-chlorobenzyl, instead of the 4'-ethoxyphenyl radicle, other alkoxyphenyl-groups, such as 2'- or 4'-methoxy-phenyl are best suited.

The new coupling components are obtained according to methods generally known for the production of analogous substitution products of isomeric aminonaphthol sulphonic acids. For example the 2 - (4' - ethoxyphenyl) - amino - 6 - hydroxy-naphthalene-8-sulphonic acid is obtained by arylating the 2-amino - 6 - hydroxynaphthalene-8-sulphonic acid with p-phenetidine in presence of sulphite, the 2-benzylamino- or the glycine of the 2-amino-6-hydroxynaphthalene-8-sulphonic acid by treating the aminonaphthol sulphonic acid with benzylhalides or halogen acetic acids, the N-methyl-ω-sulphonic acid by decomposition with formaldehyde and bisulphite.

What I claim is:—

1. A process for the manufacture of ortho-hydroxyazo dyestuffs capable of being chromed, consisting in coupling an ortho-hydroxy-diazonium compound of the benzene series with a member of the group consisting of the N-alkyl-, N-aralkyl- and N-aryl derivatives of 2-amino-6-hydroxy-naphthalene-8-sulphonic acid.

2. A process for the manufacture of ortho-hydroxyazo dyestuffs capable of being chromed, consisting in coupling a nitro-ortho-hydroxy-diazonium compound of the benzene series with a member of the group consisting of the N-alkyl-, N-aralkyl- and N-aryl derivatives of 2-amino-6-hydroxy-naphthalene-8-sulphonic acid.

3. A process for the manufacture of ortho-hydroxy-azo dyestuffs capable of being chromed, consisting in coupling a nitro-ortho-hydroxy-diazonium compound of the benzene series with a 2-alkylamino-6-hydroxynaphthalene-8-sulphonic acid.

4. A process for the manufacture of ortho-hydroxyazo dyestuffs capable of being chromed, consisting in coupling a nitro-ortho-hydroxy-diazonium compound of the benzene series with a 2-phenylamino - 6 - hydroxynaphthalene - 8 - sulphonic acid.

5. A process for the manufacture of ortho-hydroxyazo dyestuffs capable of being chromed, consisting in coupling diazotized picramic acid with 2-dimethylamino-6-hydroxynaphthalene-8-sulphonic acid.

6. A process for the manufacture of ortho-hydroxyazo dyestuffs capable of being chromed, consisting in coupling diazotized 6-nitro-4-methyl-2-amino-phenol with 2-phenylamino-6-hydroxynaphthalene-8-sulphonic acid.

7. A process for the manufacture of ortho-hydroxyazo dyestuffs capable of being chromed, consisting in coupling diazotized 5-nitro-2-amino-phenol with 2-(4'-ethoxyphenyl)-amino-6-hydroxynaphthalene-8-sulphonic acid.

8. Ortho-hydroxyazo dyestuffs from an ortho-hydroxy-diazonium compound of the benzene series and a member of the group consisting of the N-alkyl-, N-aralkyl-, N-aryl-derivatives of 2-amino-6-hydroxynaphthalene-8-sulphonic acid, said dyestuffs yielding dyeings which, when chromed, have remarkable fastness properties.

9. Ortho-hydroxyazo-dyestuffs from a nitro-ortho-hydroxy-diazonium compound of the benzene series and a member of the group consisting of the N-alkyl-, N-aralkyl-, N-aryl-derivatives of 2-amino-6-hydroxynaphthalene-8-sulphonic acid, said dyestuffs yielding dyeings which, when chromed, have remarkable fastness properties.

10. Ortho-hydroxyazo dyestuffs from a nitro-ortho-hydroxy-diazonium compound of the benzene series and a 2-alkylamino-6-hydroxy-naphthalene-8-sulphonic acid, said dyestuffs yielding dyeings which, when chromed, have remarkable fastness properties.

11. Ortho-hydroxyazo dyestuffs from a nitro-ortho-hydroxy-diazonium compound of the benzene series and a 2-phenylamino-6-hydroxynaphthalene-8-sulphonic acid, said dyestuffs yielding dyeings which, when chromed, have remarkable fastness properties.

12. The ortho-hydroxyazo dyestuff from diazotized picramic acid and 2-dimethyl-amino-6-hydroxynaphthalene-8-sulphonic acid of the probable formula of the dyestuff acid.

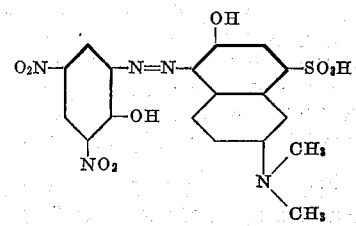

being a dark powder soluble in water to a dull bluish green solution and in concentrated sulphuric acid to a blue-red solution, dyeing wool in an acid bath green tints which become, when afterchromed, an olive of excellent fastness properties.

13. The ortho-hydroxyazo dyestuffs from diazotized 6-nitro-4-methyl-2-amino-phenol and 2-phenylamino-6-hydroxynaphthalene-8-sulphonic acid of the probable formula of the dyestuff acid

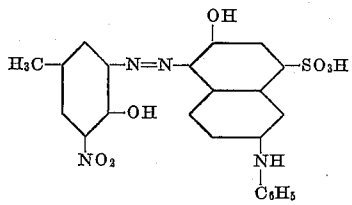

being a black powder, soluble in water to a blue solution and in concentrated sulphuric acid to a blue-red solution, dyeing wool in an acid bath bluish green tints which become, when afterchromed, a grey of excellent fastness properties.

14. The ortho-hydroxyazo dyestuff from diazotized 5-nitro-2-amino-phenol and 2-(4'-ethoxyphenyl)-amino-6-oxynaphthalene-8-sulphonic acid of the probable formula of the dyestuff acid

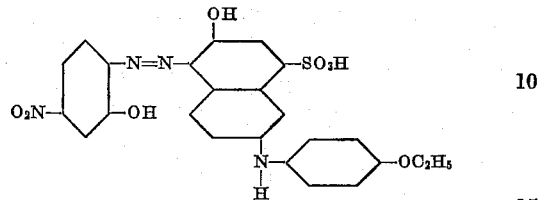

being a dark powder soluble in water to a green solution and in concentrated sulphuric acid to a red-violet solution, dyeing wool in an acid bath green tints which become, when afterchromed, a grey of excellent fastness properties.

ADOLF KREBSER.